(12) United States Patent
Rudrapatna (10) Patent No.: US 9,450,659 B2
(45) Date of Patent: Sep. 20, 2016

(54) METHOD AND APPARATUS TO GENERATE VIRTUAL SECTOR WIDE STATIC BEAMS USING PHASE SHIFT TRANSMIT DIVERSITY

(71) Applicant: Alcatel-Lucent USA Inc., Murray Hill, NJ (US)

(72) Inventor: Ashok N. Rudrapatna, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/622,580

(22) Filed: Sep. 19, 2012

(65) Prior Publication Data

US 2014/0079097 A1 Mar. 20, 2014
US 2015/0244442 A9 Aug. 27, 2015

Related U.S. Application Data

(60) Provisional application No. 61/555,686, filed on Nov. 4, 2011.

(51) Int. Cl.
*H04B 7/02* (2006.01)
*H04B 7/06* (2006.01)
*H01Q 3/30* (2006.01)
*H01Q 3/40* (2006.01)
*H01Q 21/26* (2006.01)

(52) U.S. Cl.
CPC ............. *H04B 7/0617* (2013.01); *H01Q 3/30* (2013.01); *H01Q 3/40* (2013.01); *H01Q 21/26* (2013.01); *H04B 7/0682* (2013.01)

(58) Field of Classification Search
CPC  H04B 7/0413; H04B 7/0452; H04B 7/0617; H04B 7/0408; H04B 7/0682; H04B 7/02
USPC ................................ 375/267, 299, 347, 349
See application file for complete search history.

(56) References Cited

U.S. PATENT DOCUMENTS

| | | | | |
|---|---|---|---|---|
| 5,204,686 A | * | 4/1993 | Petrelis et al. | 342/374 |
| 5,530,449 A | * | 6/1996 | Wachs | H01Q 3/267 342/174 |
| 5,686,926 A | * | 11/1997 | Kijima et al. | 342/373 |
| 5,761,351 A | * | 6/1998 | Johnson | H01Q 3/2676 343/853 |
| 6,252,912 B1 | * | 6/2001 | Salinger | 375/278 |
| 6,509,883 B1 | * | 1/2003 | Foti | H01P 1/161 343/850 |

(Continued)

FOREIGN PATENT DOCUMENTS

CN  1521957 A  8/2004
EP  1282242 A1  2/2003

OTHER PUBLICATIONS

International Search Report (PCT/ISA/210) for International Application No. PCT/US2012/063163 dated Feb. 6, 2013.

(Continued)

*Primary Examiner* — Emmanuel Bayard
(74) *Attorney, Agent, or Firm* — Harness, Dickey & Pierce, P.L.C.

(57) ABSTRACT

In one embodiment, the method includes receiving a signal, and generating first and second transmission signals from the received signal. The first signal has a fixed phase, and the second signal has a phase that changes over time. The first and second signals are sent from first and second antennas, respectively.

20 Claims, 3 Drawing Sheets

(56) References Cited

U.S. PATENT DOCUMENTS

| | | | |
|---|---|---|---|
| 6,542,556 B1* | 4/2003 | Kuchi et al. | 375/299 |
| 6,703,976 B2 | 3/2004 | Jacomb-Hood et al. | 342/373 |
| 6,735,182 B1* | 5/2004 | Nishimori | H01Q 3/26 342/372 |
| 6,788,661 B1* | 9/2004 | Ylitalo et al. | 370/334 |
| 6,906,601 B2 | 6/2005 | Fayyaz | 333/156 |
| 6,980,778 B2* | 12/2005 | Benning et al. | 455/101 |
| 7,272,359 B2* | 9/2007 | Li | H04L 1/0003 375/260 |
| 7,414,577 B2* | 8/2008 | Mohamadi | 342/373 |
| 7,433,713 B2* | 10/2008 | Haskell | H01Q 1/246 342/372 |
| 7,450,657 B2* | 11/2008 | Paulraj | H04B 7/0615 375/267 |
| 7,684,511 B2* | 3/2010 | Chiurtu | H04B 7/0615 375/267 |
| 7,697,622 B2* | 4/2010 | Han et al. | 375/260 |
| 7,817,641 B1* | 10/2010 | Khandani | 370/395.4 |
| 7,904,034 B2* | 3/2011 | Khan | H04B 7/0682 375/296 |
| 8,111,772 B2* | 2/2012 | Chen | H01Q 3/30 375/267 |
| 8,185,161 B2* | 5/2012 | Haskell | H01Q 1/246 455/562.1 |
| 8,249,187 B2* | 8/2012 | Harel | H04B 7/0623 375/260 |
| 8,345,639 B2* | 1/2013 | Hensley et al. | 370/334 |
| 8,374,221 B2* | 2/2013 | Budampati | H04B 7/0857 375/148 |
| 8,482,462 B2* | 7/2013 | Komijani | H04B 7/0617 342/372 |
| 8,508,409 B2* | 8/2013 | Hosoya | G01S 3/74 342/373 |
| 8,526,525 B2* | 9/2013 | Keerthi | H04B 7/086 375/259 |
| 8,526,878 B2* | 9/2013 | Maruhashi et al. | 455/39 |
| 8,619,544 B2* | 12/2013 | Gaal | H04J 13/00 370/209 |
| 8,730,922 B2* | 5/2014 | Hultell | H04B 7/0404 370/329 |
| 8,744,374 B2* | 6/2014 | Aue | H04B 7/0413 375/267 |
| 8,774,196 B2* | 7/2014 | Schmidt | H04B 7/0682 342/383 |
| 8,872,719 B2* | 10/2014 | Warnick | H01Q 1/0025 343/853 |
| 9,100,076 B2* | 8/2015 | Naguib | H04B 7/0417 |
| 2002/0044564 A1* | 4/2002 | Ranta | 370/436 |
| 2002/0171583 A1* | 11/2002 | Purdy et al. | 342/368 |
| 2002/0193071 A1* | 12/2002 | Waltho | 455/24 |
| 2003/0021352 A1* | 1/2003 | Benning et al. | 375/267 |
| 2003/0022634 A1* | 1/2003 | Benning et al. | 455/101 |
| 2003/0108087 A1* | 6/2003 | Shperling | H04B 7/0613 375/146 |
| 2003/0137464 A1* | 7/2003 | Foti | H01P 1/161 343/770 |
| 2003/0162566 A1* | 8/2003 | Shapira et al. | 455/561 |
| 2003/0190897 A1* | 10/2003 | Lei et al. | 455/101 |
| 2003/0195017 A1* | 10/2003 | Chen et al. | 455/562.1 |
| 2003/0227353 A1* | 12/2003 | Fayyaz | 333/161 |
| 2004/0027279 A1* | 2/2004 | Jacomb-Hood | 342/368 |
| 2004/0132413 A1 | 7/2004 | Hwang et al. | |
| 2005/0012665 A1* | 1/2005 | Runyon et al. | 342/372 |
| 2005/0063483 A1* | 3/2005 | Wang | H04L 1/0618 375/267 |
| 2006/0058022 A1* | 3/2006 | Webster | H01Q 3/267 455/423 |
| 2006/0245346 A1* | 11/2006 | Bar-Ness | H04L 1/0071 370/203 |
| 2006/0250941 A1* | 11/2006 | Onggosanusi | H04B 7/0691 370/208 |
| 2006/0264183 A1* | 11/2006 | Chen et al. | 455/101 |
| 2007/0041465 A1 | 2/2007 | Paulraj et al. | |
| 2007/0041466 A1* | 2/2007 | Chiurtu et al. | 375/267 |
| 2007/0080886 A1* | 4/2007 | Thomas et al. | 343/824 |
| 2007/0093274 A1* | 4/2007 | Jafarkhani et al. | 455/562.1 |
| 2007/0183515 A1* | 8/2007 | Lim et al. | 375/260 |
| 2007/0223380 A1* | 9/2007 | Gilbert et al. | 370/235 |
| 2007/0274411 A1* | 11/2007 | Lee et al. | 375/267 |
| 2007/0286190 A1* | 12/2007 | Denzel | H04L 49/101 370/389 |
| 2008/0188229 A1* | 8/2008 | Melis et al. | 455/450 |
| 2008/0211717 A1* | 9/2008 | Boeck | H01Q 3/38 342/377 |
| 2008/0219377 A1* | 9/2008 | Nisbet | 375/296 |
| 2008/0260064 A1* | 10/2008 | Shen et al. | 375/299 |
| 2008/0273618 A1* | 11/2008 | Forenza | H04B 7/022 375/261 |
| 2009/0167605 A1* | 7/2009 | Haskell | 342/372 |
| 2009/0213903 A1* | 8/2009 | Wu et al. | 375/140 |
| 2010/0020892 A1* | 1/2010 | Lee et al. | 375/260 |
| 2010/0073260 A1* | 3/2010 | Fujita | 343/904 |
| 2010/0074309 A1* | 3/2010 | Lee et al. | 375/219 |
| 2010/0091896 A1* | 4/2010 | Lee et al. | 375/260 |
| 2010/0151784 A1* | 6/2010 | Grau Besoli et al. | 455/39 |
| 2010/0156188 A1* | 6/2010 | Fishman | H02J 3/383 307/77 |
| 2010/0189055 A1* | 7/2010 | Ylitalo | 370/329 |
| 2010/0214073 A1* | 8/2010 | Kasai et al. | 340/10.2 |
| 2010/0254485 A1* | 10/2010 | Yoshii | H04B 7/0413 375/295 |
| 2010/0321238 A1* | 12/2010 | Shen | 342/373 |
| 2010/0322349 A1* | 12/2010 | Lee et al. | 375/299 |
| 2011/0075745 A1* | 3/2011 | Kleider et al. | 375/260 |
| 2011/0102262 A1* | 5/2011 | Haskell | 342/372 |
| 2011/0187614 A1* | 8/2011 | Kirino et al. | 343/713 |
| 2011/0222503 A1 | 9/2011 | Nakao et al. | |
| 2012/0050107 A1* | 3/2012 | Mortazawi et al. | 342/372 |
| 2012/0256702 A1* | 10/2012 | Khlat et al. | 333/133 |
| 2012/0275356 A1* | 11/2012 | Aharony | H04B 7/0689 370/310 |
| 2013/0057432 A1* | 3/2013 | Rajagopal et al. | 342/368 |
| 2013/0072247 A1* | 3/2013 | Park et al. | 455/513 |
| 2013/0147664 A1* | 6/2013 | Lin | 342/372 |
| 2013/0202054 A1* | 8/2013 | Khan et al. | 375/259 |
| 2013/0244594 A1* | 9/2013 | Alrabadi et al. | 455/78 |
| 2013/0314280 A1* | 11/2013 | Maltsev et al. | 342/368 |
| 2013/0336425 A1* | 12/2013 | Lee et al. | 375/303 |
| 2014/0016573 A1* | 1/2014 | Nuggehalli et al. | 370/329 |
| 2014/0056256 A1* | 2/2014 | Kim et al. | 370/329 |
| 2014/0076972 A1* | 3/2014 | Smith | 235/439 |
| 2014/0105319 A1* | 4/2014 | Lee et al. | 375/267 |

OTHER PUBLICATIONS

Written Opinion of the International Searching Authority (PCT/ISA/237) for International Application No. PCT/US2012/063163 dated Feb. 6, 2013.

International Preliminary Report on Patentability (PCT/IB/373) issued May 6, 2014 for corresponding International Application No. PCT/US2012/063163.

* cited by examiner

METHOD AND APPARATUS TO GENERATE VIRTUAL SECTOR WIDE STATIC BEAMS USING PHASE SHIFT TRANSMIT DIVERSITY

This application claims priority under 35 U.S.C. §119(e) to Provisional U.S. application No. 61/555,686 filed on Nov. 4, 2011.

BACKGROUND OF THE INVENTION

In modern wireless systems (e.g., LTE, WIMAX, HSPA, UMTS, CDMA, etc) base station (BS) antennas are defined both physically and logically (in LTE they are referred to as antenna ports). Logical antennas are mapped to and implemented via physical antennas (e.g., typically several physical antennas are mapped to one logical antenna). Physical antennas are generally transparent and not visible to mobile stations (MSs), while logical antennas are generally distinguishable to MSs.

When these physical antennas are combined to yield one logical antenna, identical signals corresponding to the logical antenna are transmitted over multiple physical antennas after they are pre-processed through pre-coding matrices. These signals thus transmitted combine over the air to yield one signal transmitted over a logical antenna.

Some of these signals (such as common channels including broadcast channels) need to achieve proper sector-wide (or cell-wide as it is known in the GSM/UMTS context) coverage. Achieving this coverage is often hard especially if the number of physical antennas that make up a logical antenna is small. For example, currently two physical antennas can not provide sector wide coverage for one logical antenna according to existing techniques. Furthermore, if sufficient physical antennas are used to obtain sector-wide coverage, existing techniques produce a combined over-the-air signal that fails to fully utilize the full BS power. Also it is desirable to do this without resorting to calibration capability that is needed to measure and equalize the phase differences across the physical antennas of the logical antenna port since doing so adds cost and complexity to the antenna.

Figure 1:
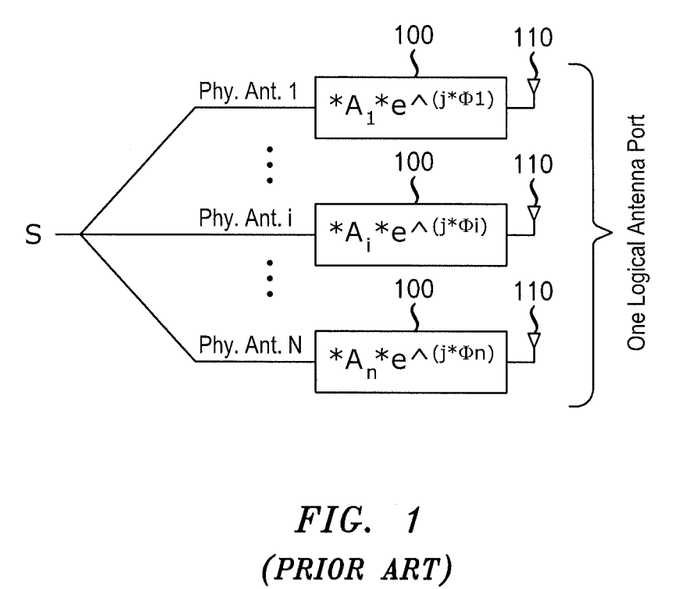
FIG. 1 illustrates one of the common ways to achieve sector-wide static beams.

FIG. 1 illustrates one of the most common ways to achieve sector-wide static beams. As shown, each transformer 100 applies a fixed gain $A_i$ and fixed phase $\phi_i$ to the same signal S. Namely, the gain and phase do not change with time such that the transmission from each antenna 110 associated with a respective one of the transformers 100 remains fixed over the time of transmission. The transmissions from the multiple antennas 110 that make up an antenna port are combined over the air.

The combining can in general (in most cases, but not all e.g., not with 2 antennas) yield proper sector wide static beams with proper choice of gains and phases. This typically requires correlated antenna configuration, i.e., under most circumstances co-polarized antennas that are spaced fractions of a wavelength, apart.

However, in general such combining often suffers from some problems. For example, such combining requires a calibration capability: measurement of gains and phases across the different transmission paths and compensating for any such differences across the different paths that exist in real physical systems. This calibration capability adds cost, operational complexity and an additional part that can fail. As another example problem, the gains that need to be employed often do not permit utilization of full transmission power of each path.

Another method is to map only one physical antenna (instead of N physical antennas) to one logical antenna port for these sector-wide beams and associated common channels. In this case, instead of utilizing the N-antenna's power for these common channels only the power of the one actual antenna that is used to map to the logical antenna port will be utilized. The disadvantage is that the BS power is significantly under-utilized and wasted for these common channels.

SUMMARY OF THE INVENTION

At least one embodiment relates to a method of generating transmission signals.

In one embodiment, the method includes receiving a signal, and generating first and second transmission signals from the received signal. The first signal has a fixed phase, and the second signal has a phase that changes over time. The first and second signals are sent from first and second antennas, respectively.

In one embodiment, the generating includes applying a first gain to the received signal to generate the first signal, and applying a second gain and phase shift to the received signal to generate the second signal. The applied phase shift changes over time.

In one embodiment, the first and second gains are equal.

In another embodiment, the method includes receiving a signal, and phase shifting the signal at a plurality of transformers to produce a plurality of phase shifted signals, each of the plurality of phase shifted signals having a phase that changes over time. Each of the plurality of phase shifted signals are sent from a different antenna.

In one embodiment, the phase shifting produces the phase shifted signals such that at least some of the phase shifted signals have phases that change at different phase change rates. In one embodiment, the phase change rate of each of the plurality of phase shifted signals is an integer multiple of a reference phase change rate. In one embodiment, one of the plurality of phase shifted signals has a phase that changes at the reference phase change rate.

Any of these embodiments may further include setting gains of the plurality of phase shifted signals. In one embodiment, the same gain is set for the plurality of phase shifted signals.

In a further embodiment, the method includes receiving first and second signals, generating first and second transmission signals from the first received signal such that the second transmission signal changes phase at a first rate greater than a rate of the first transmission signal, and generating third and fourth signals from the second received signal such that the fourth transmission signal changes phase at a second rate greater than a rate of the third transmission signal, the second rate being one of opposite and same as the first rate. The first, second, third and fourth transmission signals are sent from first, second, third and fourth antennas, respectively.

At least one embodiment relates to a transmitter.

In one embodiment, the transmitter includes a plurality of transformers. Each transformer receives a same signal, and at least one of the transformers phase shifts the signal to produce a phase shifted signal having a phase that changes over time. The transmitter also includes an antenna corresponding to each of the plurality of transformers. Each antenna sends output produced by the corresponding one of the plurality of transformers.

In one embodiment, the plurality of transformers produce more than one phase shifted signal such that at least some of the phase shifted signals have phases that change at different phase change rates In one embodiment, the phase change rate of each of the phase shifted signals is an integer multiple of a reference phase change rate.

In one embodiment, one of the phase shifted signals has the reference phase change rate.

In any of the above embodiments, the transformers may apply respective gains to the signal. In one embodiment, the transformers apply a same gain to the signal.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "mobile station" may be synonymous to a mobile user, user equipment or UE, mobile terminal, user, subscriber, wireless terminal, terminal, and/or remote station and may describe a remote user of wireless resources in a wireless communication network. Accordingly, a mobile station (MS) may be a wireless phone, wireless equipped laptop, wireless equipped appliance, etc.

The term "base station" may be understood as a one or more cell sites, base stations, nodeBs, enhanced NodeBs (eNodeB), access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the MS is typically called downlink or forward link communication. Communication from the MS to the base station is typically called uplink or reverse link communication.

Figure 2:
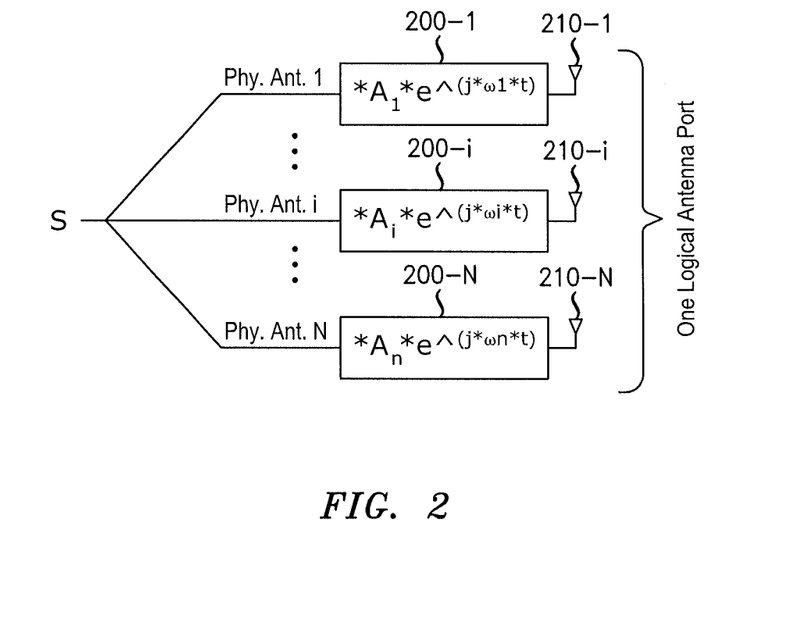
FIG. 2 illustrates a transmitter implementing a method to achieve sector-wide static beams according to an embodiment.

FIG. 2 illustrates a transmitter implementing a method to achieve sector-wide static beams according to an embodiment. This embodiment employs phase shift transmit diversity (PSTD) across the transmit array. As shown in FIG. 2, the transmitter includes a plurality N of transformers 200 that receive a signal S in parallel, where N is greater than or equal to two. The transmitter may be included in a wireless device such as a base station. Each transformer 200 may phase shift the signal S differently, and supplies the phase shifted signal to a respective physical antenna 210. The N physical antennas 210 form one logical antenna. Instead of the phase (4) being varied across the antennas (in addition to the gains) as in the conventional approach, in the PSTD approach the rate of change of phase ($\omega$) is varied across the array. Namely, as shown, each of the transformers 200 may generate a phase shifted signal in the same manner as shown below for the ith transformer 200-$i$. The ith transformer 200-$i$ generates a phase shifted signal PSI according to the expression:

$$PSi = S*A_i*e^{\wedge}(j*\omega_i*t) \quad (1)$$

where S is the original signal associated with the antenna port, A is the gain, $\omega$ is a phase change rate, and t is time. Stated another way, over the time of transmission, the phase of the phase shifted signal PSi may increase linearly with time. This results in the combined signal across the PSTD processed antennas sweeping across the sector over time.

In one embodiment, the gains may all be set to the same constant, for example set equal to 1 (i.e., $A_i=1$ for all i). The embodiments are not limited to this restriction. Namely, the transformers 200 may also affect the gain as well as the phase of the signal S, In addition, the signals may be transmitted in one particular embodiment over correlated antenna configurations, e.g., co-polarized antennas that are spaced fractions of wavelength, $\lambda$ apart. Note that in other environments correlated antenna configurations may be feasible under non-co-polarized antennas or antennas spaced further apart than fractions of wavelength.

Alternatively or additionally, the phase change rates for a number of the antennas 210 may be set such that $\omega_i=i*\omega_r$, where $\omega_r$ is a reference phase change rate. In one embodiment, $\omega_1=\omega_r$. Please note that this is not a requirement but an implementation simplification. Still further, one of the phase change rates may be set to zero. This may apply, for example, to a two antenna case described in detail below with respect to FIG. 3.

The transformers 200 may be implemented in the analog domain using RF circuits where the phase changes uniformly as a function of time as described in the equation above for each antenna. The transformers 200 may instead be implemented in the digital domain using a processor such as a digital signal processor wherein the signal is multiplied with a precoder chosen from a precoder set in accordance to the above equation at applicable time t, stepping through each sequentially in specified intervals in a cyclic manner.

When viewed at a time snapshot, the effect of the PSTD pre-coding technique of the example embodiments is to cause the identical signals coming from different antennas to combine over the air in such a way as to form a directional beam. As time progresses, the directional beam will sweep spatially across the sector. These signals when integrated by MS (which is normally done by an MS for various operations such as channel estimates, channel quality estimates, channel rank, precoder matrix indices for feeding back to the base station, etc.) over several cycles of the highest frequency of PSTD across the antennas (e.g., $\omega_n$ in the one example) will yield the equivalent beam pattern as that of a single physical antenna, but with the total power equivalent of all the transmit paths put together. Namely, the MS sees a static beam with N times the power of a single transmit branch. Accordingly, the beam being swept across the sector produces a virtual static sector-wide beam as seen by the MS. Furthermore, because of the MS time integration, any phase and amplitude calibration mismatch that exists across the transmit array will be nullified. Thus antenna level calibration is not needed. This method preserves the following benefits: excellent sector wide coverage for each antenna port across the band (identical to a single antenna coverage) to ensure sector wide coverage for common channels; utilization of full base station power across common channels to ensure adequate common channel coverage; simplicity of implementation of the static beam forming approach; simplicity of PSTD pre-coder to implement; and elimination of antenna level calibration.

Figure 3:
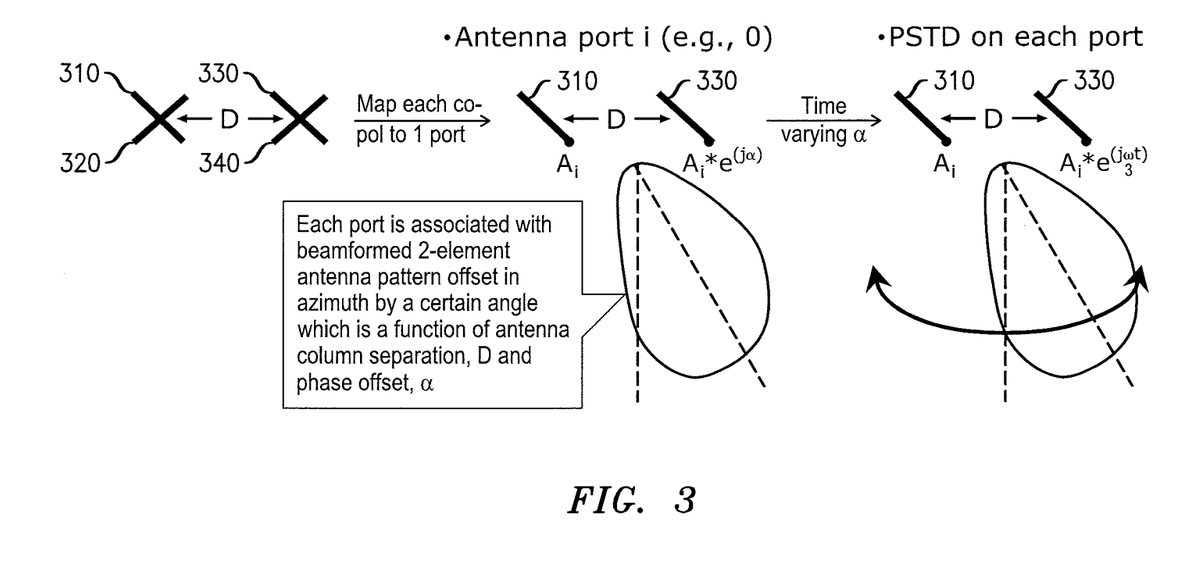
FIG. 3 illustrates the specific example of two antennas forming a logical antenna according to an embodiment.

FIG. 3 illustrates the specific example of two antennas forming a logical antenna according to an embodiment. A further benefit of the techniques according to the above described embodiments is that sector-wide coverage may be obtained using only two physical antennas. FIG. 3 shows a 4 physical antenna configuration where first and second physical antennas 310 and 320 have a column separation of D from third and fourth physical antennas 330 and 340. FIG. 3 further shows that the first and third antennas 310 and 330 are mapped to and form one logical antenna. As will be appreciated, second and fourth antennas 320 and 340 may be mapped to and form a second logical antenna. As will be understood, providing two logical antennas in this manner provides support for MIMO operations. The phase change rate, $\omega$ may be the same or different across the different logical antenna ports. In a typical embodiment, the phase change rate across the two logical antenna ports are inverted, i.e., $\omega$ may be applied to antenna 330 relative to antenna 310 to form logical antenna port 0 as described above, and the opposite phase change rate (i.e., $-\omega$) may be applied to antenna 340 relative to antenna 320 to form logical antenna port 1 in a similar manner. In such a case MIMO operation is applied across the logical antenna ports 0 and 1. Also, it will be understood that, instead, the same phase change rate $\omega$ could be applied to antenna 340 relative to antenna 320.

The embodiment illustrated in FIG. 3 assumes the implementation simplification of applying the same gain (e.g., Ai). Still further, the phase change rate associated with the first physical antenna 310 may be set to zero. Namely, with respect to FIG. 2, the phase change rate of the first transformer 200-1 is set equal to zero. By contrast, the third transformer 200-3 associated with the third physical antenna 330 sets the phase change rate $\omega_3$ to a non-zero value. As such, the phase shifted signal from the third physical antenna 330 will have a time varying phase offset $\alpha$ from the first physical antenna 310, where $\alpha=\omega t$. During operation, the phase shifted signal from the third physical antenna 330 results in the combined beam-formed signal across the first and third antennas 310 and 330 sweeping across the sector when observed over time as shown in FIG. 3.

The example embodiments being thus described, it will be obvious that the same may be varied in many ways. For example, in a related embodiment the PSTD combining can be done across cross-polarized antenna 310 and 320 within the same column (or 310 and 340 across columns) instead of the co-polarized array as described above. This is intended to achieve a circularly or an elliptically polarized beam-formed signal in each logical antenna port instead of a uni-polarized beam-formed signal as described above. Such variations are not to be regarded as a departure from the invention, and all such modifications are intended to be included within the scope of the invention.

I claim:

1. A transmitter, comprising:
a first antenna and a first transformer associated with the first antenna; and
a second antenna and a second transformer associated with the second antenna, the first transformer and the second transformer being configured to receive a same signal and phase shift the signal to produce a plurality of phase shifted signals, each of the phase shifted signals having a phase that changes over time, the first antenna and the second antenna being spaced apart by a desired column distance and mapped to a first logical antenna port, the first antenna and the second antenna being configured to send the plurality of phase shifted signals such that (i) a first resultant beam formed signal from the first logical antenna port has a transmit power equal to a sum of a transmit power of the first antenna and a transmit power of the second antenna, and (ii) the first resultant beam formed signal has a same time averaged beam shape as a beam formed signal from one of the first antenna and the second antenna.

2. The transmitter of claim 1, wherein the first transformer and the second transformer are configured to produce the phase shifted signals such that at least some of the phase shifted signals have phases that change at different phase change rates.

3. The transmitter of claim 2, wherein the phase change rate of each of the plurality of phase shifted signals is an integer multiple of a reference phase change rate.

4. The transmitter of claim 3, wherein one of the plurality of phase shifted signals has a phase that changes at the reference phase change rate.

5. The transmitter of claim 1, wherein the first transformer and the second transformer are configured to set gains of the plurality of phase shifted signals.

6. The transmitter of claim 5, wherein the first transformer and the second transformer are configured to set a same gain for the plurality of phase shifted signals.

7. The transmitter of claim 1, further comprising:
a third antenna and a third transformer associated with the third antenna, the third antenna being offset by a desired angle from the first antenna; and
a fourth antenna and a fourth transformer associated with the fourth antenna, the fourth antenna being offset by the desired angle from the second antenna, the third antenna and the fourth antenna being mapped to a second logical antenna port, the plurality of phase shifted signals including signals produced by the third transformer and the fourth transformer, the plurality of phase shifted signals being sent such that (i) a second resultant beam formed signal from the second logical antenna port has a transmit power equal to a sum of a transmit power of the third antenna and a transmit power of the fourth antenna, and (ii) the second resultant beam formed signal has a same time averaged beam shape as a beam formed signal from one of the third antenna and the fourth antenna.

8. The transmitter of claim 1, wherein an azimuth of the first resultant beam formed signal is based on the desired column distance and a phase offset between the first antenna and second antenna.

9. A transmitter, comprising:
a first antenna;
a second antenna offset by a desired angle from the first antenna;
a first transformer associated with the first antenna; and
a second transformer associated with the second antenna and a first transformer, the first transformer and the second transformer being configured to receive a same signal and phase shift the signal to produce a plurality of phase shifted signals, each of the phase shifted signals having a phase that changes over time, the first antenna and the second antenna being mapped to a first logical antenna port and configured to send the plurality of phase shifted signals such that (i) a first resultant beam formed signal from the first logical antenna port has a transmit power equal to a sum of a transmit power of the first antenna and a transmit power of the second antenna, and (ii) the first resultant beam formed signal has a same time averaged beam shape as a beam formed signal from one of the first antenna and the second antenna.

10. The transmitter of claim 9, further comprising:
a third antenna;
a fourth antenna offset by the desired angle from the third antenna, the third antenna and the fourth antenna being mapped to a second logical antenna port and being spaced apart from the first antenna and the second antenna by a desired column distance;
a third transformer associated with the third antenna; and
a fourth transformer associated with the fourth antenna, the plurality of phase shifted signals including signals produced by the third transformer and the fourth transformer, the plurality of phase shifted signals being sent such that (i) a second resultant beam formed signal from the second logical antenna port has a transmit power equal to a sum of a transmit power of the third antenna and a transmit power of the fourth antenna, and (ii) the second resultant beam formed signal has a same time averaged beam shape as a beam formed signal from one of the third antenna and the fourth antenna.

11. A method, comprising:
receiving, by a first antenna and a second antenna, a same signal, the first antenna including a first transformer, the second antenna including a second transformer;
generating, by the first transformer and the second transformer, a plurality of phase shifted signals based on the received signal, each of the phase shifted signals having a phase that changes over time, the first antenna and the second antenna being spaced apart by a desired column distance and mapped to a first logical antenna port; and
sending, by the first antenna and the second antenna, the plurality of phase shifted signals such that (i) a first resultant beam formed signal from the first logical antenna port has a transmit power equal to a sum of a transmit power of the first antenna and a transmit power of the second antenna, and (ii) the first resultant beam formed signal has a same time averaged beam shape as a beam formed signal from one of the first antenna and the second antenna.

12. The method of claim 11, wherein the generating generates the phase shifted signals such that at least some of the phase shifted signals have phases that change at different phase change rates.

13. The method of claim 12, wherein the phase change rate of each of the plurality of phase shifted signals is an integer multiple of a reference phase change rate.

14. The method of claim 13, wherein one of the plurality of phase shifted signals has a phase that changes at the reference phase change rate.

15. The method of claim 11, further comprising:
setting, by the first transformer and the second transformer, gains of the plurality of phase shifted signals.

16. The method of claim 15, wherein the setting sets a same gain for the plurality of phase shifted signals.

17. The method of claim 11, wherein,
the receiving includes receiving the signal by a third antenna and a fourth antenna, the third antenna including a third transformer and being offset by a desired angle from the first antenna, the fourth antenna including a fourth transformer and being offset by the desired angle from the second antenna, the third antenna and the fourth antenna being mapped to a second logical antenna port,
the generating includes generating, by the third transformer and the fourth transformer, the plurality of phase shifted signals, and
the sending sends the plurality of phase shifted signals such that (i) a second resultant beam formed signal from the second logical antenna port has a transmit power equal to a sum of a transmit power of the third antenna and a transmit power of the fourth antenna, and (ii) the second resultant beam formed signal has a same time averaged beam shape as a beam formed signal from one of the third antenna and the fourth antenna.

18. The method of claim 11, wherein an azimuth of the first resultant beam formed signal is based on the desired column distance and a phase offset between the first antenna and second antenna.

19. A method, comprising:
receiving, by a first antenna and a second antenna, a same signal, the second antenna being offset by a desired angle from the first antenna, the first antenna including a first transformer, the second antenna including a second transformer, the first antenna and the second antenna being mapped to a first logical antenna port;
generating, by the first transformer and the second transformer, a plurality of phase shifted signals, each of the phase shifted signals having a phase that changes over time; and
sending, by the first antenna and the second antenna, the plurality of phase shifted signals such that (i) a first resultant beam formed signal from the first logical antenna port has a transmit power equal to a sum of a transmit power of the first antenna and a transmit power of the second antenna, and (ii) the first resultant beam formed signal has a same time averaged beam shape as a beam formed signal from one of the first antenna and the second antenna.

20. The method of claim 19, wherein,
the receiving includes receiving the signal by a third antenna and a fourth antenna offset by the desired angle from the third antenna, the third antenna and the fourth antenna being mapped to a second logical antenna port and being spaced apart from the first antenna and the second antenna by a desired column distance, the third antenna including a third transformer, the fourth antenna including a fourth transformer,
the generating includes generating, by the third transformer and the fourth transformer, the plurality of phase shifted signals, and
the sending sends the plurality of phase shifted signals sent such that (i) a second resultant beam formed signal from the second logical antenna port has a transmit power equal to a sum of a transmit power of the third antenna and a transmit power of the fourth antenna, and (ii) the second resultant beam formed signal has a same time averaged beam shape as a beam formed signal from one of the third antenna and the fourth antenna.

* * * * *